July 29, 1969

J. KREBS 3,458,246

MULTIPOWERED MAGNIFIER

Filed Dec. 16, 1965

INVENTOR
JACOB KREBS

BY *B.P. Fishleman*

ATTORNEY

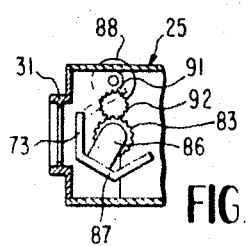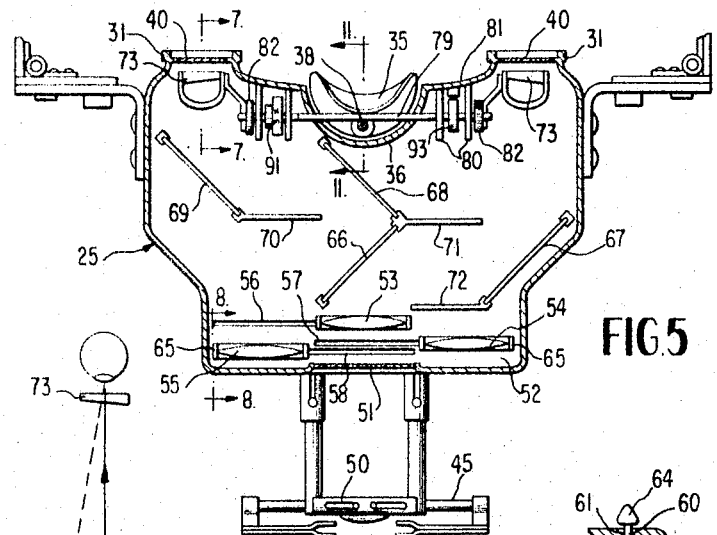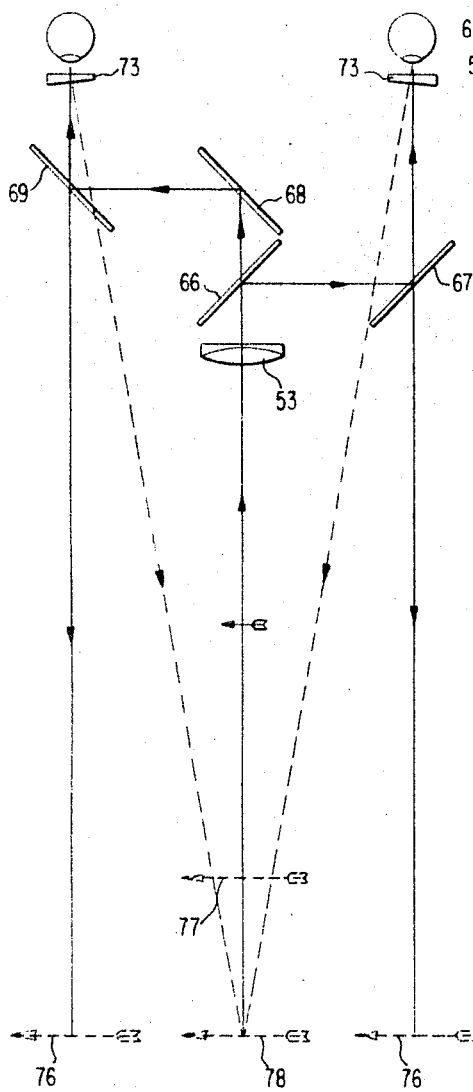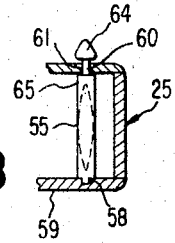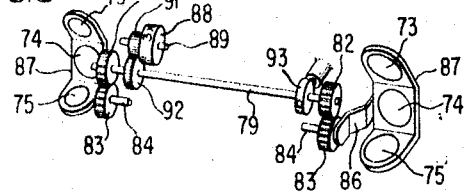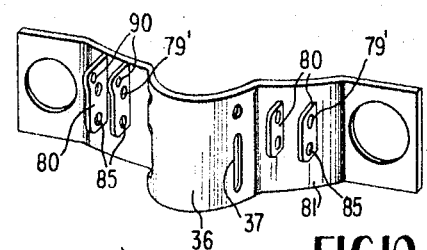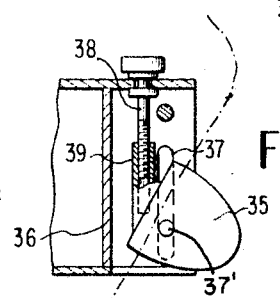

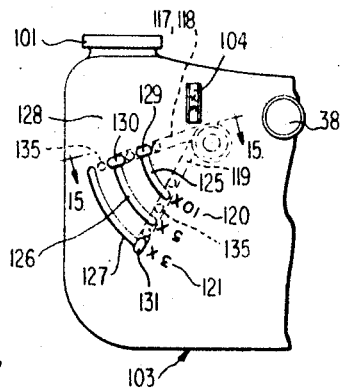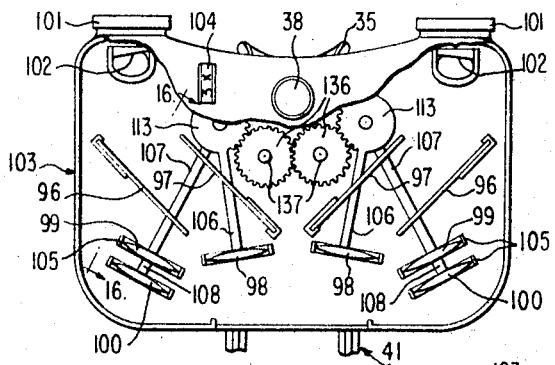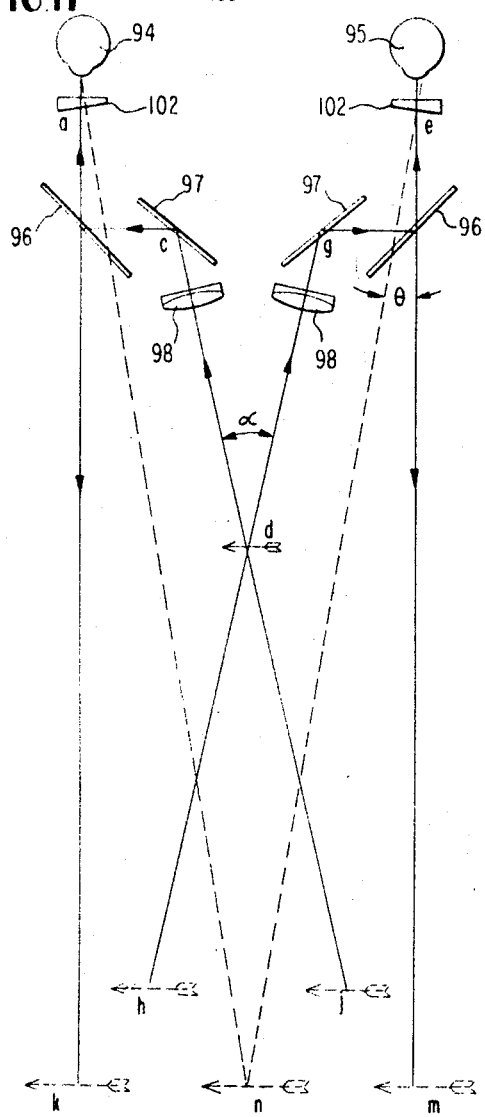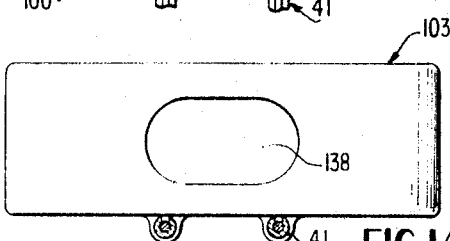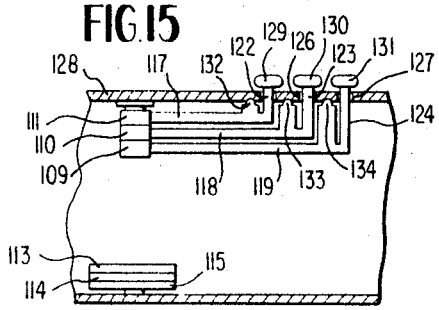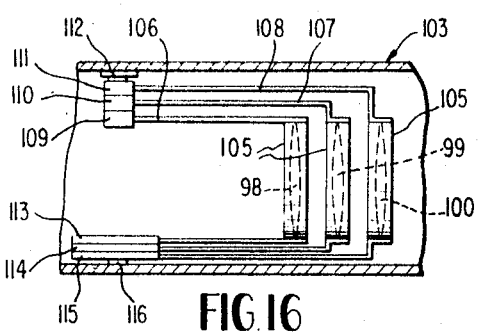

United States Patent Office 3,458,246
Patented July 29, 1969

3,458,246
MULTIPOWERED MAGNIFIER
Jacob Krebs, 2445 Fairmount Ave.,
Philadelphia, Pa. 19130
Filed Dec. 16, 1965, Ser. No. 514,194
Int. Cl. G02b 25/00, 7/04, 23/02
U.S. Cl. 350—146                           11 Claims

ABSTRACT OF THE DISCLOSURE

An optical magnifier unit mountable on the head of the user and having enclosed multipowered binocular optics easily adjustable to provide the required magnification with little space between optical lenses. The unit is compact, lightweight and comfortable.

---

This invention relates to optical magnifiers primarily intended for examining various small objects under relatively low magnifications.

More particularly, the invention is concerned with magnifiers which are mountable upon the head of the user in the manner of ordinary spectacles, but with a number of mechanical adjustments, permitting permanent adjustment to the individual wearer's physiognomy. These adjustments are important in the invention in supplying the necessary comfort and also in aligning the pupils of the eyes accurately with the eyepiece center lines.

Another major objective of the invention is to provide a magnifier which may be produced as a multipowered binocular-type magnifier with enclosed optics on a spectacle frame and, alternatively, may be produced in the form of a multipowered stereoscopic magnifier.

The invention instrument is believed to be an exceptionally useful device for various technicians in defense and other industries who perform bench or laboratory work on minute intricate devices. Additionally, coin and stamp collectors, jewelers and photographers should find the invention highly useful in the careful examination of their work. In this connection, another objective of the invention resides in the provision directly on the magnifier of an adjustable workpiece supporting device or means.

Another object of the invention is to provide magnifiers of the mentioned type which are highly compact in construction, lightweight, reasonably rugged and durable, convenient to adjust and relatively economical to manufacture.

Other objects and advantages of the invention will become apparent during the course of the following detailed description.

In the accompanying drawings, forming a part of this application, and in which like numerals are employed to designate like parts throughout the same:

FIGURE 5 is a horizontal cross section through the instrument shown in FIGURE 1, revealing the optical components and associated mechanisms, parts broken away;

FIGURE 6 is a simplified optical diagram for the instrument shown in FIGURE 5;

FIGURE 7 is an enlarged fragmentary vertical section taken substantially on line 7—7 of FIGURE 5 showing the optical wedge driving means in one extreme adjusted position;

FIGURE 8 is a fragmentary enlarged vertical section taken on line 8—8 of FIGURE 5;

FIGURE 9 is a perspective view of the drive means for optical wedges;

FIGURE 10 is a perspective view of a rear wall or panel employed for mounting an adjustable nose pad and the optical wedge drive means;

FIGURE 11 is an enlarged fragmentary vertical section taken substantially on line 11—11 of FIGURE 5, with parts omitted;

FIGURE 12 is a fragmentary view, similar to FIGURE 5, showing a modification of the invention wherein a stereoscopic magnifier is provided;

FIGURE 13 is a fragmentary plan view of the modified invention, partly broken away;

FIGURE 14 is a front elevational view of the modified invention shown by FIGURE 12, partly in section;

FIGURE 15 is a fragmentary vertical section taken on line 15—15 of FIGURE 13;

FIGURE 16 is a similar section taken on line 16—16 of FIGURE 12; and

FIGURE 17 is a diagrammatic view of the optics employed in the modified form of the invention.

Figure 1:
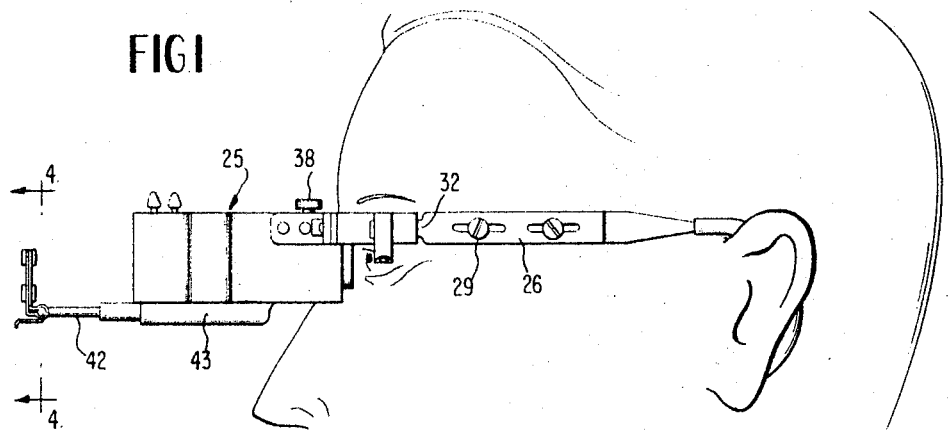
FIGURE 1 is a side elevation of one preferred embodiment of the invention showing the same mounted for use.

In the drawings, wherein for the purpose of illustration are shown preferred embodiments of the invention, attention is directed first to FIGURES 1 through 11 illustrating a multipowered binocular magnifier. In these figures, a housing for optical components is designated generally by the numeral 25 and this housing is relatively shallow vertically and includes top and bottom flat parallel walls. As viewed in plan, FIGURE 2, the housing 25 is contoured to enclose the optics therein in the minimum practical space allowing for proper movement of parts and yet rendering the instrument in its overall dimensions as compact as possible.

The housing and all parts mounted thereon are adapted to be mounted upon the head of the user, like spectacles, as shown in FIGURE 1. To facilitate this, temple bars 26 are hinged at 27 to suitable brackets 28 which are rigidly secured to the opposite side walls of housing 25. The temple bars are longitudinally extensible as by the screw-threaded slotted means 29 and they are also laterally adjustable on the brackets 28 through similar adjustment means indicated at 30. These adjustments and others to be described allow the magnifier to be permanently adjusted so as to meet the needs of the individual wearer.

Figure 2:
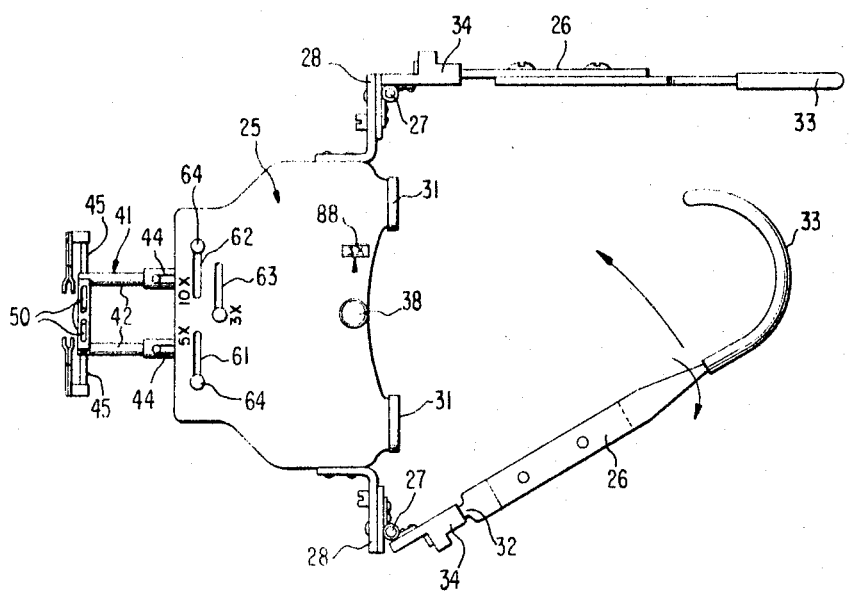
FIGURE 2 is a plan view of the invention showing one of the temple bars in a partially folded and rotated position.
Figure 3:
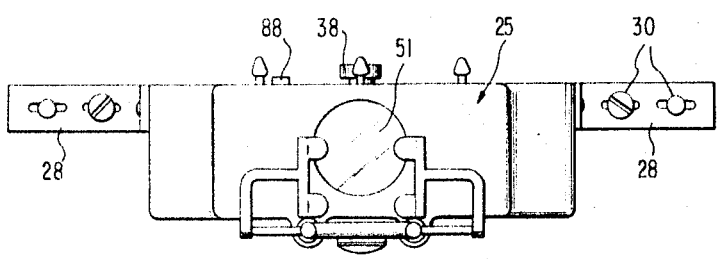
FIGURE 3 is a front elevational view of the invention.

As depicted in FIGURE 2, the temple bars 26 are foldable upon the axes of hinges 27 to overlapping positions near the eyepieces 31 of the instrument. The forward shanks 32 of the temple bars are also turnable upon their axes so that the earpieces 33 will lie parallel to the top and bottom walls of the housing, while folded. This enables the magnifier, while not in use, to be carried in a small case or in the pocket. The bearings 34 which receive the small shanks 32 are preferably equipped with convential spring-pressed ball detents or the like to releasably hold the temple bars in either of the adjusted positions shown in FIGURE 2, where the earpieces 33 may be parallel to the top wall of the housing 25 or perpendicular thereto for ready engagement behind the ears. These various adjustments, not commonly found on ordinary spectacles, are employed on the present instrument in order to enhance its accuracy, comfort and efficiency in the examining of close work.

A further important feature in this respect resides in the provision of a contoured adjustable nose bridge piece 35 which is preferably padded with soft material. The bridge piece 35 lies within the confines of a concave housing rear wall section 36, FIGURES 5 and 10, the bridge piece being vertically adjustable along slots 37 by means of a swiveled adjusting screw 38 and coacting nut 39, the latter secured to the bridge piece 35 as shown in FIGURE 11. Referring to FIGURE 11, the bridge piece 35 carries trunnions 37' which follow in guide slots 37 when screw 37 is turned. This arrangement allows vertical adjustment of the eyepieces 31 relative to the bridge of the wearer's nose so that the eyepiece center lines will closely coincide to the center lines of the eye pupils. Furthermore, the center lines of the eyepieces 31 are spaced apart by a distance which corresponds to the average interpupillary distance of humans, and the eyepiece diameters are large enough to allow for some deviation from the average interpupillary distance. If the wearer's eyesight is imperfect, prescription lenses, not shown, can be fitted into the eyepiece chambers 40, FIGURE 5.

The magnifier is provided at its front with an adjustable work support or frame 41 including a pair of horizontal extensible and retractable telescoping tubes 42 which are mounted upon the bottom wall of the housing 25, as indicated at 43 in FIGURE 1. Preferably, the extensible tubes 42 are pulled out a fixed distance from the housing 25 during all usage of the instrument and limit slots 44 establish this distance. This distance will remain the same regardless of which of several objective lenses is placed in position in the housing, as will be further described. For example, the distance of the object being viewed to the most distant lens of the instrument may be chosen to be a certain distance, such as two inches; thus, the work holder including the tubes 42 need be extended no further than approximately one and one-half inches beyond the front wall of the housing 25 for any of the three magnifications which may be obtained with the instrument. The focal lengths of lenses 53, 54 and 55 are chosen to supply proper magnification and to insure that the object-to-lens distance lies well inside of the focal lengths to avoid any distortion of the magnified image.

Figure 4:
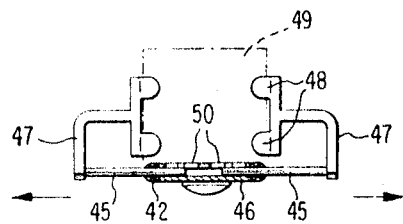
FIGURE 4 is a fragmentary vertical section taken on line 4—4 of FIGURE 1 and showing the work supporting frame partially extended.

The work support 41 further comprises laterally extensible transverse rods 45 engaging a transverse guide 46 rigid with the members 42. At their ends, rods 45 carry upstanding arms 47 having clip extensions 48 for grasping the work or element 49 to be held and examined, such as a postage stamp, coin, film, jewelry articles, or any small work piece. The construction of the particular work holding clips or elements may be widely varied under the invention to meet particular needs and the invention certainly is not limited to the clips 48 shown for illustrative purposes only. FIGURE 4 shows the arms 47 extended to intermediate positions. Limit slots 50 in the transverse guide 46 control the extent of movement of the arms 47 and associated elements in the inward and outward directions. The work support, above-described, holds the object being examined in proper alignment with the optical system in the housing 25, said housing having a front protective clear glass plate or window 51 in alignment with the work support means.

FIGURES 5 and 6 show the optical components within the housing 25 which are employed in the multipowered magnifier. Referring to FIGURE 5, in the forward compartment 52 of the opaque housing 25 are plural laterally shiftable objective or magnifying lenses 53, 54 and 55. These lenses are employed selectively and one at a time to provide the desirable degree of magnification. The three-power magnification lens 53 is shown in the operative position in the drawings in alignment with the window 51 and on the longitudinal center line of the instrument. The intermediate lens 54 is the basic five-power lens and the lens 55 is the more powerful ten-power lens. Both of the lenses 54 and 55 are shown in the aside or non-use positions. Each of the three lenses is independently shiftable laterally within the housing 25 along parallel transverse guide grooves 56, 57 and 58 formed in the bottom wall 59, see FIGURE 8. The tops of the lens carriers have pins or shanks 60 which operate in guide slots 61, 62 and 63, FIGURE 2, directly above and parallel to the several grooves of the bottom wall 59. The slots 61, 62 and 63 are formed through the housing top wall, as shown. Above the top wall of the housing, each lens unit is equipped with a manual operating knob 64 allowing the individual objective lenses to be selectively shifted to and from the center active position. In this connection, all of the grooves and guide slots for the lens units are so positioned in the housing that each individual lens may always be shifted with accuracy to the active or operating position, as shown for the lens 53 in FIGURE 5. The lenses are held rigidly inside of a suitable carrier ring 65 or the like.

Rearwardly of the objective lenses and generally centrally of the housing 25, a 45° beamsplitter 66 is fixedly mounted reflecting one-half of the light onto a parallel 45° fixed mirror 67 near one side wall of the housing. The remainder of the light coming through the particular active objective lens passes through the beamsplitter 66 to another fixed 45° reflector or mirror 68 in the rear central portion of the housing at right angles to the beamsplitter. This light is in turn reflected to a third 45° parallel mirror 69 near the other housing side wall and rearwardly of the beamsplitter, as shown. Opaque fixed baffles 70, 71 and 72 prevent the peripheral portion of the wearer's vision from directly viewing the actual object through portions of the beamsplitter and objective lens. It is essential that both eyes view only the one magnified and fused image formed by the instrument and the several opaque baffles contribute toward this result.

Functioning in conjunction with the objective lenses 53, 54 and 55 are matched pairs of optical wedges 73, 74 and 75. Each matched pair of wedges coacts with a particular one of the lenses 53, 54 and 55 to fuse two identical images 76, FIGURE 6, representing the magnified object 77 into one image 78 of the same final magnification. As shown in the drawings, this optical fusion is obtained by having the thin edges of each pair of wedges opposed or facing one another.

Mechanical means are provided to move the respective pairs of wedges 73, 74 and 75 into alignment with the eyepieces 31 so that the correct wedges can be matched with and utilized with the particular objective lens which is being employed. For example, in the drawings, the lens 53 producing three-power magnification is in the active position and the other two lenses are inactive. The optical wedges 73 which are matched with the lens 53 are also in their active positions while the wedges 74 and 75 are idle or inactive.

The means for moving the optical wedges 73, 74 and 75 comprises a transverse rotary shaft 79 journaled within openings 79', FIGURE 10, of bearing parts 80 which project forwardly of the rear wall 81 of the housing. The ends of shaft 79 carry spur gears 82 meshing with gears 83 on another shaft 84 below the shaft 79 and journaled in openings 85 of the bearing parts 80. The gears 83 are directly connected with arms 86, which in turn directly carry the angled holders 87 or mounts for optical wedges 73, 74 and 75.

A small hand wheel 88 is mounted on a stub shaft 89 supported in openings 90, FIGURE 10, of one pair of bearing parts 80. The shaft 89 also carries a small drive gear 91 meshing with another gear 92 on the shaft 79. The hand wheel 88 extends operatively through a small slot in the top wall of housing 25 for ready engagement by the finger of the user of the instrument. The wheel 88 is visibly marked on its periphery at spaced points with the several magnifications obtainable selectively in the instrument.

The intermediate rotary shaft 79 is equipped with a three point detent means 93, as shown in FIGURE 9. This detent means may comprise a spring-pressed ball adapted to enter circumferentially spaced peripheral openings in a disc on the shaft 79, as shown. Any other conventional form of detent may be employed for causing the gearing system for the optical wedges to position the pairs 73, 74 and 75 selectively in alignment with the eyepieces and then releasably hold them in such positions for use with the particular objective lens 53, 54 or 55 with which they are matched. In response to turning of the small wheel 88 manually, the gears 91 and 92 drive the countershaft 79 which turns reversely to the shaft 89. However, the shaft 84 carrying the wedge holders 87 will be driven in the same direction as the shaft 89 and hand wheel. The visible indications of magnification on the hand wheel 88 are spaced properly to show through the top wall slot, FIGURE 2, the proper alignment of wedges with the proper objective lenses. The lens magnification is also visibly indicated on the housing top wall adjacent the slots 61, 62 and 63 for easy matching up. In brief, whenever a particular objective lens 53, 54 or 55 is shifted to the active position, the corresponding pair of optical wedges is rotated into the operating position on the axes of the eyepieces, as shown. FIGURES 2, 5 and 7 of the drawings show the wedges 73 in the active positions to work in conjunction with the three-power magnification objective lens 53. FIGURE 9 is merely an illustrative view showing the mechanism and does not show the active positions of the wedges 73 shown in the other views.

In light of the above-detailed description, it is thought that the operation or use of the magnifier is now readily apparent to anyone skilled in the art. First, the mechanical adjustments are made so that the instrument will be properly positioned and comfortable upon the wearer. The workpiece to be inspected is mounted on the holder means 41 and the holder is extended forwardly to the fullest extent allowed by the slots 44. The desired magnification is established by shifting any one of the lenses 53, 54 or 55 into alignment with the window 51 while the other two lenses are allowed to remain in the outermost idle positions. The particular pair of image fusing or composing wedges corresponding to the chosen lens is rotated into alignment with the eyepiece axes and the workpiece is then studied. If it is desired to increase or decrease magnification during the examination, the lenses may be shifted and the wedges rotated while the instrument remains mounted on the head and this is done very simply with the fingers.

FIGURES 12–17 disclose a modification of the invention pertaining to a multi-powered magnifier which has stereoscopic capabilities.

With reference to diagrammatic FIGURE 17, the basis of stereoscopic vision is that the line of sight from each eye 94 and 95 must converge on an object so that each eye observes a slightly different and independent view of the object. In FIGURE 17, $c-d$ and $g-d$ indicate such converging lines. Ordinarily, straight converging lines from each eye to the object have been optically "folded" by symmetric fixed mirrors 96 and 97 so that the object may be positioned closer to the eyes and the three pairs of objective lenses 98, 99 and 100, FIGURE 12, can be "packaged" closer to each other and to the plane $a-e$, FIGURE 17. If the wearer's eyes were placed at the eyepieces 101 and no optical wedges were present, the three-power objective lenses 98 shown in the magnifying position would project magnified images of the object at $h$ and $j$; the images actually seen by the left eye and right eye without wedges would be at $m$ and $k$, respectively.

As in the prior embodiment, the purpose of the optical wedges 102 is to shift lines $a-k$ and $e-m$ by an angle $\theta$, so that the two images fuse into one final magnified image at $n$.

The specifications of the three pairs of objective lenses 98, 99 and 100 are such that the same type of workholding means 41, previously described, can be employed and pulled forwardly a fixed distance from the housing 103 in all cases, and still result in a correct final magnification by each objective lens pair when a correct corresponding pair of optical wedges are employed. When five-power magnification is desired, lenses 98 are swung away from their active positions shown in FIGURES 12 and 17, and lenses 99 are moved into alignment with paths $c-d$ and $g-d$. Since the images previously at $k$ and $m$ will now shift further away from the plane $a-e$ (and also increase in size) because of increased magnification, the angle $\theta$ will decrease correspondingly and another pair of optical wedges is rotated into position in front of the eyepieces 101 so that both images fuse into one. Still another pair of optical wedges is employed for ten-power magnification with the forwardmost pair of lenses 100. The construction and operation of the optical wedge means may be identical to that shown in the prior embodiment and need not be shown or described again in detail in connection with the modification for a proper understanding of the modification. For example, the small finger-operated wheel 104, shown in FIGURES 12 and 13, may correspond identically to the wheel 88 in the gear train of FIGURE 9 for the prior embodiment.

The manipulating means for the magnifying objectives 98, 99 and 100 is depicted in FIGURES 12, 15 and 16. As in FIGURE 16, each lens 98, 99 and 100 is supported in a holder ring 105, in turn carried by yokes 106, 107 and 108. The upper arms of these yokes are independently pivoted as at 109, 110 and 111 to a fixed upper pivot element 112. The lower arms of the yokes are similarly pivoted at 113, 114 and 115 to a fixed common lower pivot element 116 on the housing. As best illustrated in FIGURE 15, the individual objective lens carrying yokes or frames 106, 107 and 108 are caused to turn in pairs on their pivots with the respective lenses 98, 99 and 100 by means of levers 117, 118 and 119 which are also integrally connected to the upper pivot elements 111, 110 and 109. It will be noted by comparison of FIGURES 15 and 16 that the shorter lever 117 actually controls the longest yoke 108 and the ten-power lenses 100. While the ten-power lenses 100 are forwardmost in the housing 103, FIGURE 13 correctly shows the ten-power magnification symbol 120 innermost and the three-power symbol 121 radially outermost. This correctly corresponds to FIGURES 15 and 16.

The operating levers 117, 118 and 119 have upright extensions 122, 123 and 124 which operate through arcuate slots 125, 126 and 127 in the housing toy wall 128. The tops of the extensions are equipped with operating knobs 129, 130 and 131 to facilitate transferring the pairs of lenses on their pivots by simple finger movement above the housing top wall. The arms or levers 117, 118 and 119 are somewhat springy and are held releasably in the two extremes of their positions adjacent the ends of the slots 125, 126 and 127 by integral detent elements 132, 133 and 134, received in shallow recesses in the housing top wall, these recesses being indicated in broken lines in FIGURE 13 at 135. Each coacting pair of lenses 98, 99 and 100 will swing in unison with their yokes 106, 107 and 108 by manipulation of the proper levers because the lower pivot elements 113, 114 and 115 do, in fact, have gear teeth formed thereon, as shown clearly in FIGURE 12, and intermesh with idlers 136, suitably mounted on stub shafts 137 fixedly supported within the housing 103 near the bottom thereof. It will be understood that there are three separate idler gears 136 in stacked relation on each shaft 137 so that each related pair of objective lenses and their yokes may be swung in unison by operation of the levers 117, 118 and 119.

The mirrors 96 and 97 are fixedly mounted within the housing 103 in any conventional manner. The housing front wall has a protective thin glass plate or window 138, as shown in the drawings. All other parts and their functions are identical to the corresponding parts shown and described in the prior embodiment of the invention.

The general use or operation of the multipowered stereoscopic magnifier is identical to that of the prior embodiment. With the device adjusted and comfortably mounted upon the head, a particular pair of the stereoscopic magnifying lenses are swnug into position to provide the desired degree of magnification for particular work. The corresponding setting of the optical wedges is made utilizing the hand wheel 104 exactly as described in the prior embodiment. The lenses and the optical wedges co-function in pairs to magnify the image and fuse or resolve it into a single stereoscopic image for the viewer whose eyes are at the eyepieces 101. The adjustments can be made quickly and accurately and without effort.

I claim:

1. A multipowered magnifier comprising a housing having spaced eyepiece openings, means on the housing engageable with the head of the wearer enabling the magnifier to be worn generally in the manner of spectacles, a forwardly extensible and rearwardly retractable object holder on the front of the housing, a plurality of individually useable magnifying objective lenses shiftably mounted within the housing and each adapted to be moved to an optically active and an optically inactive position within the housing, manual means on the housing connected with the individual lenses to effect their movement, coacting plural optical wedges within the housing arranged in pairs adjacent to said eyepiece openings, the pairs of wedges being movable to and from optically active positions where they may coact with the lenses when the latter are also in optically active positions, manual means on the housing connected with the optical wedges for shifting the pairs of wedges to and from said active positions and including visible indicia correlating certain pairs of wedges with certain lenses, and fixed mirror elements within the housing intermediate the lenses and optical wedges.

2. The invention as defined by claim 1, and wherein said plural magnifying lenses are laterally shiftably mounted within the housing with respect to the longitudinal axis thereof and said pairs of optical wedges are mounted for rotation into and away from alignment with said eyepiece openings upon a rotational axis extending transversely of the housing.

3. The invention as defined by claim 2, and means to releasably hold the pairs of wedges and selected lenses in their optically active and inactive positions within the housing.

4. The invention as defined by claim 1, and wherein said magnifying objective lenses are arranged in coacting pairs and swingable generally laterally within the housing toward and away from optically active positions, pivoted support means carrying each coacting pair of lenses and manually-operated gearing on the housing connected with said support means to cause simultaneous swinging of each coacting pair of lenses.

5. A multi-powered binocular magnifier comprising a housing adapted to be supported upon the head of a user and having eyepiece openings, a work support means on the front of said housing, a plurality of laterally slidable independently useable magnifying lenses in the forward portion of the housing each shiftable to and from a central optically active position and to and from a side inactive position, a diagonal beamsplitter within the housing rearwardly of said lenses and arranged in optical alignment with the lens in said active position, coacting fixed mirrors in said housing on opposite sides of and behind the beamsplitter, matched plural pairs of image composing optical wedges in the rearward portion of the housing, each pair optically compatible with one of said lenses, indicia means for correlating the lenses and pairs of wedges for particular magnifications, and means rotatably supporting said pairs of wedges in said housing adjacent said eyepiece openings so that particular pairs of wedges may be rotated into alignment with the eyepiece openings.

6. The invention as defined by claim 5, and wherein said means rotatably supporting said pairs of wedges comprises holders for said wedges maintaining them in paired relationship and in fixed angular relationship, a rotary shaft secured to and carrying said holders, a countershaft, gearing interconnecting the countershaft and first-named shaft, detent means connected with the countershaft to releasably secure the same in plural rotational positions causing selected pairs of said wedges to be aligned with said eyepiece openings, and manual means on the housing connected with said countershaft to turn it.

7. The invention as defined by claim 6, and wherein the last-named means is a manual index wheel rotatable on the housing, and gearing interconnecting said wheel and countershaft.

8. A multi-powered stereoscopic magnifier comprising a housing having eyepieces, a forward work holder on said housing, pairs of stereoscopic magnifying lenses within said housing with each related pair swingable horizontally toward and away from converging optically active positions, a gearing connected with said pairs of lenses to cause swinging movement of each pair in unison, detent lever means on the housing connected with said gearing to facilitate the manual operation thereof, coacting pairs of optical wedges in the rear portion of said housing near said eyepieces, rotary means supporting said wedges so that selected pairs thereof may be turned into alignment with said eyepieces, a manual element on the housing to operate said rotary means, detent means connected with the rotary means to releasably secure the same in selected positions, and diagonal reflector elements within the housing intermediate said pairs of lenses and pairs of optical wedges.

9. The invention as defined by claim 8, and wherein said gearing includes spaced drive gears rotatably mounted within the housing and pairs of intermediate idler gears meshing with the drive gears and with each other, and yokes carrying said lenses and directly connected with said drive gears and pivotally connected with said housing.

10. A multipowered binocular magnifier comprising a housing body portion and means to attach the body portion to the head of a wearer, the housing body portion having rearward spaced eyepiece means and a forward viewing window, work holder means on the front of the body portion and being forwardly and rearwardly adjustable, plural selectively and individually usable magnifying lenses shiftably mounted within the housing body portion and each movable to optically active and inactive positions within the housing manually, coacting plural optical wedges within the housing body portion arranged in pairs adjacent the eyepiece means, said wedges movable to optically active and inactive positions within the housing manually, and reflector means mounted within the housing body portion intermediate said lenses and wedges.

11. The invention as defined by claim 10, and extensible and laterally adjustable temple bars on the sides of the housing body portion, and a substantially vertically adjustable nose piece on the rear of the housing body portion engaging the bridge of the nose of the wearer of the binocular magnifier.

References Cited

UNITED STATES PATENTS

| | | | |
|---|---|---|---|
| 624,369 | 5/1899 | McLernon | 350—146 |
| 1,252,089 | 1/1918 | Clarke | 350—142 |
| 2,091,173 | 8/1937 | Wottring | 351—2 |
| 2,152,050 | 3/1939 | Henning et al. | 351—2 X |
| 2,337,866 | 12/1943 | Boughton et al. | 351—128 X |
| 2,387,758 | 10/1945 | Jaros | 350—145 X |

DAVID SCHONBERG, Primary Examiner

P. A. SACHER, Assistant Examiner

U.S. Cl. X.R.

350—38, 44, 50, 137